(No Model.)
H. BARNES.
METHOD OF LINING PLATES OF PLASTIC MATERIAL WITH GOLD, &c.
No. 348,183. Patented Aug. 31, 1886.
Fig. 1.
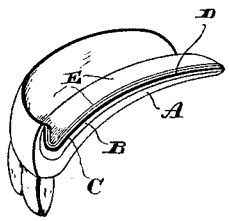
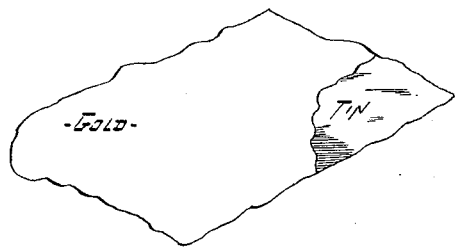
Fig. 2.
WITNESSES
G. F. Downing
J. E. Jones
INVENTOR
Hamlin Barnes.
By Leggett and Leggett
Attorney

United States Patent Office.

HAMLIN BARNES, OF EAST LIVERPOOL, OHIO, ASSIGNOR OF ONE-HALF TO HASTINGS & CO., OF PHILADELPHIA, PENNSYLVANIA.

METHOD OF LINING PLATES OF PLASTIC MATERIAL WITH GOLD, &c.

SPECIFICATION forming part of Letters Patent No. 348,183, dated August 31, 1886.

Application filed December 31, 1885. Serial No. 187,239. (No model.)

*To all whom it may concern:*

Be it known that I, HAMLIN BARNES, of East Liverpool, in the county of Columbiana and State of Ohio, have invented certain new and useful Improvements in the Method of Lining Plates of Plastic Material with Gold, &c.; and I do hereby declare the following to be a full, clear, and exact description of the invention, such as will enable others skilled in the art to which it appertains to make and use the same.

My invention relates to an improvement in the method of lining plates of plastic material with gold, platinum, or other metal not easily fused.

The object is to provide a method which will insure the firm attachment of the gold or other metal to the plastic material.

With these ends in view my invention consists in first preparing the gold by facing it with tin, and then coating the tinned surface with cement, and pressing the gold thus prepared into contact with the prepared rubber plate.

My invention further consists in preparing the rubber plate to receive the gold by coating it with a layer of vulcanizable gutta-percha.

My invention further consists in certain details of procedure, as will be set forth at length hereinafter.

In the accompanying drawings, Figure 1 represents a portion of a mouth-plate adapted to use in securing false teeth in position, showing the different layers which compose it in section; and Fig. 2 is a detached view of a piece of the tinned-faced gold.

A represents the base-layer, preferably composed of rubber; B, the vulcanizable gutta-percha layer; C, the cement; D, the tin facing on the gold, and E the gold.

The method of procedure is as follows: Gold foil, or a thin sheet of gold, is coated with tin, either by electric deposition or it may be accomplished by soldering tin-foil thereto. The latter is accomplished by covering the surface of the gold with a flux, laying the tin-foil thereon, and subjecting the whole to heat sufficient to melt the tin-foil. When the gold-foil has been thus supplied with a tinned surface, the latter is covered with rubber cement of ordinary composition. The base, which preferably consists of rubber, is loosely packed into the mold in a soft state, and the model or male section of the mold is brought into contact with the female section, thereby giving the under or lingual surface and the upper or palatine surface the general form which they are to assume in their finished state. The male section of the mold is then withdrawn, and the layer of vulcanizable gutta-percha is spread over the palatine surface of the base and the mold again closed, pressing the gutta-percha layer into conformity with the palatine surface of the base, causing it to adhere tightly thereto, and impressing upon the upper side of the gutta-percha layer the shape of the model. The plastic condition of the base and gutta-percha layer is caused by heat, and after the base and gutta-percha layer have been united they are allowed to cool somewhat before the prepared gold is applied. When they have cooled enough to become somewhat stiff, the prepared gold is spread over the palatine surface of the gutta-percha layer with the tinned cemented side in contact with the gutta-perch, the mold closed, pressing it in snug contact therewith, and the whole submitted to the usual vulcanizing heat, (320° Fahrenheit.) The gold will be thereby securely attached to the plastic base, and will be made to conform perfectly to the model, thus fitting the roof of the mouth as closely as the rubber surface itself could.

The model or male section of the mold may be either covered with cloth, or lacquered and rubbed with talc to make it deliver freely from the gutta-percha or rubber in the female section of the mold.

Vulcanizable gutta-percha alone might be used for both layers A and B, but the rubber base is preferred on account of its greater strength and durability.

The great advantage of the gutta-percha layer is that it will not creep when cooled, as rubber does, and when used as above explained serves both to keep its own position and prevent the rubber base from creeping.

Having fully described my invention, what I claim as new, and desire to secure by Letters Patent, is—

1. In the method of lining plates of plastic material with gold, platinum, &c., the preparation of the gold, consisting in first applying a metallic coating to one of its surfaces by electric deposition or otherwise, and secondly covering the coated surface with cement.

2. In the method of lining plates of plastic material with gold, platinum, &c., the preparation of a rubber base to receive the metal lining, consisting in applying thereto a layer of vulcanizable gutta-percha.

3. The method of lining plates of plastic material with gold, platinum, &c., consisting in first preparing the gold, platinum, &c., by tinning one of its surfaces and covering the tinned surface with cement; secondly, shaping a plastic base to receive the metallic lining; and, thirdly, uniting the lining and base by pressure and heat.

4. The method of lining plates of plastic material with gold, platinum, &c., consisting in first preparing the gold, platinum, &c., by tinning one of its surfaces and covering the tinned surface with cement; secondly, preparing a plastic base by attaching thereto a layer of vulcanizable gutta-percha; and, thirdly, uniting the plastic base and metallic lining by pressure and heat.

5. A plate composed of the following layers: rubber, vulcanizable gutta-percha, cement, tinfoil, and a metal not easily fused firmly united, substantially as set forth.

In testimony whereof I have signed this specification in the presence of two subscribing witnesses.

HAMLIN BARNES.

Witnesses:
E. C. SEWARD,
GEO. F. DOWNING.